Patented Sept. 10, 1940

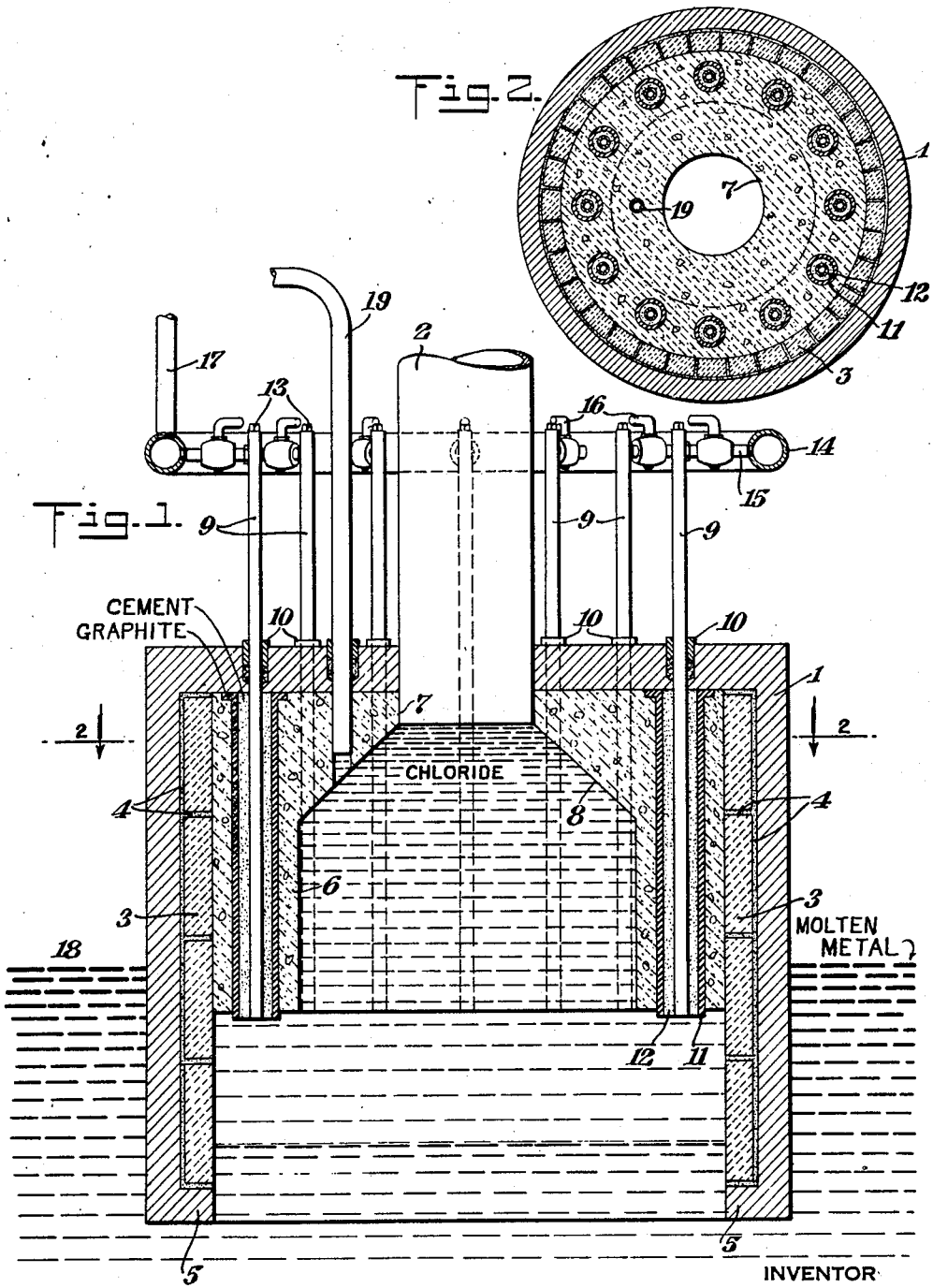

2,214,612

UNITED STATES PATENT OFFICE 2,214,612

CHLORINATING DEVICE AND LINING THEREFOR

Elmer H. Greenberg, Philadelphia, Pa.

Application January 16, 1937, Serial No. 120,877

3 Claims. (Cl. 266—34)

This invention relates to a device for chlorinating and to lining materials capable of resisting chlorine. An important embodiment of the invention is a chamber for bringing together chlorine, metal and metal chloride.

This application is a continuation in part of copending application Ser. No. 116,139, filed December 16, 1936. Said application, Ser. No. 116,139, claims an apparatus and process for treating metals particularly metals containing tin and lead with chlorine. The present application claims a device for chlorinating. The device is not restricted to use with but is preferably used as part of the apparatus in said copending application. The present application also claims the resistant lining material of said device.

The principal object of the invention is to provide a simple, efficient device of the kind described capable of permitting reaction of chlorine therein, and particularly reaction of chlorine in the presence of molten materials at elevated temperatures of the order of 1000° F. Another object of the invention is to provide a lining of cement or mortar which shall be capable of resisting chlorine.

Various further and more specific objects, features and advantages will clearly appear from the detailed description given below taken in conjunction with the accompanying drawing which form a part of the specification and illustrate by way of example a preferred form of the invention. The invention comprises the novel devices and combinations thereof, together with the novel compositions, specific embodiments of which are described hereinafter by way of example and in accordance with which I now prefer to practice the invention.

In the drawing,

Fig. 1 is a cross sectional elevation of the chlorinating device positioned in a bath containing material to be chlorinated.

Fig. 2 is a cross section on a reduced scale taken on the line 2—2 of Fig. 1.

Although, as above noted, this invention may be embodied and used independently of the apparatus and process described in the copending application Serial No. 116,139, it is herein shown and described for such use. Referring now to the drawing, the numeral 1 indicates an outer cast-iron shell in the form of an open-ended cylindrical drum lined, except at the open end, with refractory material capable of resisting chlorine and especially chlorine, molten lead, tin and their chlorides at temperatures of the order of 1000° F. through which lining passes a circular series of chlorine-resisting alloy tubes for delivering chlorine to the inside of the chamber and a tube for delivering molten metal therein. This embodiment also shows an exit pipe 2 for permitting the passage of volatile material from the inside of the chamber to the exterior thereof.

The numeral 3 indicates a lining of fire-clay brick laid edgewise and sealed against the inner wall of the cast-iron shell by means of a mortar 4 described more in detail below. These bricks form a ring extending from top to bottom inside the shell, being partially supported at the bottom by an inwardly projecting flange 5. Bonded to this ring of bricks on one side and to the inner part of the top of the shell 1 is a ring of concrete 6 whose composition is described more in detail below. The brick lining 3 may be dispensed with and replaced by cement such as that used to form the ring 6, if desired.

The diameter of the ring 6 is considerably smaller near its upper central part and through the smaller diameter 7 the pipe 2 passes from the interior of the chamber. Between the portion of the ring of larger diameter and the portion 7, the ring is preferably bevelled as shown at 8. The ring 6 as here shown extends downwardly through the reaction chamber for a little over half its distance. This arrangement is preferred when the reaction chamber is to be used for chlorination of metals containing lead and tin as described in said copending application, but it will be obvious of course that this lining of cement may have the form as shown or other desired form, and that it may be used with or without the brick construction and with or without the cast-iron shell.

As shown a plurality of chlorine tubes 9 pass through the top of the reaction chamber, being provided with packing glands 10 about that portion which passes through the cast-iron shell 1. These tubes are arranged in a circular series surrounding the interior hollow space or chamber provided by the ring 6. Each of the tubes projects as shown a short distance below the lower face of the ring 6. Each tube is of metal which is resistant to rapid corrosion by chlorine and molten chloride such as lead and tin chloride at temperatures of the order of 1000° F. I have found that the alloy known as Hastelloy C, which is a special alloy of nickel, molybdenum, chromium and iron, is satisfactory for this purpose. Each tube is preferably surrounded by a refractory graphite lining 11 which is held in place by a cement 12 which will be described below. The graphite is preferably similar to crucible graphite, being composed of graphite with a binder of fireclay. The opposite upper end of each tube is stopped by plug 13, and each is connected with a bustle pipe 14 by means of a pipe 15 which is provided with a cock 16 in order to regulate the individual flow through its feed pipe. By removing the plug 13 each of the pipes may be cleaned out, if and when necessary. The bustle pipe 14 communicates through pipe 17 with a source of chlorine which may be suitably controlled and metered as it passes to the bustle pipe 14. This assembly serves to deliver chlorine gas in a number of fine streams under controlled conditions.

The chlorine pipes as herein shown are intended to deliver chlorine to the chamber for the purpose set forth in said copending application, but chlorine may be conducted into the chamber in other ways than by means of these pipes. The reaction chamber is here shown partially submerged and in reacting position in a bath 18 of metal containing tin and lead to be chlorinated for the recovery of tin chloride, which volatilizes through the pipe 2. In addition to the chlorine tubes a pipe 19 passes through the top of the reaction chamber and through the ring 6 for delivering by pump molten tin and lead into the reaction chamber from the bath 18. This metal as so delivered passes downwardly through the bath of chlorides in the reaction chamber and causes considerable splashing and agitation of the mass in the chamber, and the lining of the chamber under these conditions must be able to withstand the effect of impact and churning of these molten chlorides and metals.

The chlorination reaction occurs at temperatures in the neighborhood of 1000–1050° F. As shown in this embodiment the ends of the chlorine pipes with their surrounding shields extend into the chamber for a distance so that they are somewhat below the outside level of the metal bath. With the reaction chamber with a cast-iron wall of about 1″ thickness having for example an outside diameter of approximately 29″ and a height of approximately 31″, the length of the chlorine tubes from the top of the reaction chamber to the ends of the tubes is about 18″. The ends of these chlorine tubes will be about 3 to 5″ below the surface of the material inside the reaction chamber when the latter is positioned so that its lower edge is submerged about 16″ below the surface of the metal. In operation the metal chloride extends to within about 2 to 5″ of the bottim of the chamber. The dimensions and positioning of the reaction chamber in the metal bath are given to show suitable conditions for operation of the reaction chamber in carrying out the process described in said copending application. The dimensions may be varied of course. With these dimensions at the end of an operation of detinning a bath containing lead and tin, the amount of chlorides formed in order to carry out the detinning operation is kept at a minimum and consequently the amount of pure metals recovered is high.

In operating at high temperatures of the order of 1000° F., the cement employed must be able to withstand shocks due to thermal changes, corrosion due to splashing of the bath or otherwise, and prevent leaks of chlorine.

The cement mortar employed in the bricks is for holding together and sealing the fire brick lining against the metal shell of the chlorinator. For this purpose I prefer to make the following mixture:

| | Per cent |
|---|---|
| 20 mesh and finer sand | 45 –50 |
| 100 mesh and finer sand | 18 –20 |
| 20 mesh and finer ground fire brick | 22.5–25 |
| Asbestos fiber | 4.5– 5 |
| Liquid sodium silicate (containing 10 to 20% of water) | 10 |

This composition is mixed with water sufficient to give a mixture having about the consistency of ordinary mortar.

I may also replace the sodium silicate and asbestos by high alumina cement and if this is done I prefer to use the following formula:

| | Per cent |
|---|---|
| 20 mesh silica | 37.5 |
| 100 mesh silica | 15 |
| 20 mesh ground fire brick | 18 |
| High alumina cement | 29.5 |

Sufficient water is added to produce a workable consistency. The proportions of the above ingredients are approximate. The fire brick used in conjunction with the silica in the above formula and in other formulae given below aids the silica in resisting shock due to sudden temperature changes. The fire brick or silica can be omitted from the above formula, the ingredient omitted being made up by a larger proportion of the other ingredient. Each of the ingredients silica and fire brick may be substituted in whole or in part by oxides such as fused or natural alumina, chromite (a mixture of chromium oxide $Cr_2O_3$ and iron oxide $Fe_2O_3$) and magnesia.

This mortar 4 may be applied to the bricks 3 and will bind the bricks to the cast-iron casing 1. At the same time the mortar will resist the effects of hot metallic chlorides and chlorine.

The ring 6 of concrete-like cement forms a monolithic construction about the graphite-encased tubes and the chlorinator shell. It seals the tops of the tubes at the roof of the chlorinator and prevents chlorine from reaching the joint between these tubes and the roof. It also serves to strengthen the graphite alloy tubes and to prevent breaking of the graphite when these tubes are being poked to free them from frozen chlorides, if necessary, and also serves to minimize thermal shocks to the graphite tubes. In addition if cracks should develop in the graphite tubes and sealing cement about them, the cement 6 tends to prevent attack of the alloy tubes through any such crack by fused metallic salts which have a slow corrosive action on these alloy tubes at the temperatures employed.

The concrete cement that I prefer to employ for the concrete lining 6 is made up as follows:

| | Per cent |
|---|---|
| 100 mesh sand | 10 |
| Ground refractory brick of not more than ¼″ size | 25 |
| 20 mesh and finer sand | 25 |
| High alumina cement | 40 |

This composition is mixed with water to produce a workable consistency to form a cement which may be molded into place to form the ring 6 as shown in the drawing. Of course the employment of this material for this purpose as specified is not restricted to the particular form shown in the drawing as it is obvious that it may be molded into other forms to produce a chlorinating chamber. This mixture I have found to give the best all around results in strength, resistance to salt attack, attack from chlorine, and thermal shock due to sudden temperature changes especially on "shutting down" operations. It has relatively little contraction while originally setting up and has little, if any relative thermal expansion and contraction with respect to the graphite-encased alloy tubes. It also shows high resistance to permeation by fused salts and their solidification therein upon being chilled. The fire brick or sand can be omitted from the above formula, the ingredient omitted being made up by a larger proportion of the other ingredient. Each of the ingredients sand and fire brick may be substituted in whole or in part by oxides such as fused or natural alumina, chromite and magnesia as in the preceding examples.

In addition to the resistance to chlorine and metal chlorides, molten lead and tin, at temperatures of about 1000° F., the cement does not shrink appreciably on setting up so that the joints it makes on the interior of the chamber are tight. In addition its expansion is about equal to that of the graphite coating so that there is no spalling due to strains or cracking or pulling away of the graphite from the cement.

As noted above the alloy tubes 10 are sealed in individual graphite tubes 11 by a cement 12. For this purpose I prefer the following cement:

|  | Per cent |
|---|---|
| 20 mesh sand | 20 |
| 20 mesh refractory brick or equivalent | 10 |
| 100 mesh and finer sand | 5 |
| High alumina cement | 65 |

The fire brick or sand can be omitted from the above formula, the ingredient omitted being made up by a larger proportion of the other ingredient. Each of the ingredients sand and fire brick may be substituted in whole or in part by oxides such as fused or natural alumina, chromite and magnesia. Sodium silicate could be used to replace the high alumina cement if desired, but it tends to shrink on setting up and in order to provide a tight joint between the graphite and Hastelloy, it is important to apply the sodium silicate under compression. Sodium silicate if properly applied will resist chemical attack by chlorine and the other agents mentioned herein, but due to its shrinkage the high alumina cement is preferred.

The steps in making up the device are that the Hastelloy tubes 9 are inserted in the graphite tubes 11 and then sealed in place by the cement 12. Meanwhile the metal shell 1 is lined with the refractory bricks set in the chlorine-resisting mortar. The graphite-coated tubes, as so assembled with the packing glands, are then inserted through holes in the roof of the cast-iron chamber 1 and positioned preferably as hereinabove indicated. Then the ring 6 of chlorine-resisting cement is cast about them with the exit pipe 2 in place.

In the appended claims as well as in the examples herein given and elsewhere in the specification, the expression "high alumina cement" is intended to designate a cement containing a higher alumina content than the ordinary hydraulic cement. An example of such high alumina cement is the type called Lumnite cement which contains approximately 38.4% alumina, 4.3% silica and 37.1% calcium oxide, with the balance made up of other oxides.

The expression "chlorine-resisting material" as used in the claims is intended to mean material which resists chlorine at low temperatures—temperatures of the order of 1000° F. with or without metallic chlorides—and/or molten metals.

While the invention has been described in detail with respect to particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. A reaction chamber for conducting therein a reaction between chlorine and metal material containing lead and tin, having an open bottom and providing a central space therein lined with refractory chlorine-resisting material, a series of pipes surrounding said central space and passng through said refractory material for conducting chlorine gas to said space, said pipes being made up of a metal alloy resistant to chlorine and surrounded by graphite tubes cemented to said pipes by a cement of silica sand, finely ground brick, and high alumina cement, and an exit for tin tetrachloride from said space.

2. Tubing consisting of an alloy steel adapted to resist rapid corrosion by chlorine and lead and tin chlorides at temperatures of the order of 1000–1100° F. surrounded by a graphite outer tube held in place by a cement of silica sand, finely ground brick, and high alumina cement.

3. A reaction chamber according to claim 1 in which the cement is composed of silica sand, finely ground brick and sodium silicate.

ELMER H. GREENBERG.